United States Patent
Jiang et al.

(10) Patent No.: US 12,117,360 B2
(45) Date of Patent: Oct. 15, 2024

(54) SYSTEM AND METHOD FOR INTELLIGENT MONITORING STRAIN AND TEMPERATURE OF BULLET TANK BASED ON DISTRIBUTED OPTICAL FIBERS

(71) Applicants: CHINA CONSTRUCTION INDUSTRIAL & ENERGY ENGINEERING GROUP CO., LTD., Nanjing (CN); CHINA CONSTRUCTION EQUIPMENT & ENGINEERING CO., LTD., Nanjing (CN)

(72) Inventors: Jun Jiang, Nanjing (CN); Fanming Shang, Nanjing (CN); Huali Wei, Nanjing (CN); Yiping Huang, Nanjing (CN); Xiangchao Wang, Nanjing (CN); Shibin Lv, Nanjing (CN); Lei Fan, Nanjing (CN); Feng Liang, Nanjing (CN); Jingting Sun, Nanjing (CN); Jie Liu, Nanjing (CN); Yumao Lin, Nanjing (CN); Changsha Liu, Nanjing (CN); Haoji Deng, Nanjing (CN); Xiaorong Chen, Nanjing (CN)

(73) Assignees: CHINA CONSTRUCTION INDUSTRIAL & ENERGY ENGINEERING GROUP CO., LTD., Nanjing (CN); CHINA CONSTRUCTION EQUIPMENT & ENGINEERING CO., LTD., Nanjing (CN)

( * ) Notice: Subject to any disclaimer, the term of this patent is extended or adjusted under 35 U.S.C. 154(b) by 0 days.

(21) Appl. No.: 18/660,801

(22) Filed: May 10, 2024

(65) Prior Publication Data

US 2024/0295464 A1   Sep. 5, 2024

Related U.S. Application Data

(63) Continuation of application No. PCT/CN2022/117757, filed on Sep. 8, 2022.

(30) Foreign Application Priority Data

Apr. 14, 2022   (CN) .......................... 202210387450.5

(51) Int. Cl.
*G01M 11/08* (2006.01)
*F17C 13/02* (2006.01)
(Continued)

(52) U.S. Cl.
CPC ......... *G01M 11/085* (2013.01); *F17C 13/025* (2013.01); *F17C 13/026* (2013.01);
(Continued)

(58) Field of Classification Search
CPC ... G01M 11/085; G01K 11/324; G01K 1/143; F17C 13/026; G01L 1/246; G01L 11/025
See application file for complete search history.

(56) References Cited

U.S. PATENT DOCUMENTS

2007/0284112 A1* 12/2007 Magne .................... E21B 43/01
166/336
2017/0146423 A1* 5/2017 Hadley ................. G01M 3/002

FOREIGN PATENT DOCUMENTS

CN    108298216 A     7/2018
CN    108917635 A  *  11/2018
(Continued)

*Primary Examiner* — Michael J Dalbo
*Assistant Examiner* — Kaleria Knox
(74) *Attorney, Agent, or Firm* — SZDC Law PC (57) ABSTRACT

In a system for intelligent monitoring strain and temperature of a bullet tank, distributed strain fiber optic cables and distributed temperature fiber optic cables are laid on a surface of a bullet tank body, and pressure gauges are
(Continued)

arranged in a soil layer below the bullet tank body, so that the surface and surrounding states of the bullet tank body are monitored. Detected data is gathered by collectors and then transmitted to a field control system. The field control system respectively performs data communication with a numerical simulation system and a central control display screen. The numerical simulation system uses finite element software to simulate the bullet tank body and the soil layer below, determines a corresponding temperature and stress change range, and transmits the temperature and stress change range to the field control system for comparison with the detected data.

10 Claims, 1 Drawing Sheet

(51) Int. Cl.
*G01K 1/143* (2021.01)
*G01K 11/324* (2021.01)
*G01L 1/24* (2006.01)
*G01L 11/02* (2006.01)

(52) U.S. Cl.
CPC ............ *G01K 1/143* (2013.01); *G01K 11/324* (2021.01); *G01L 1/246* (2013.01); *G01L 11/025* (2013.01)

(56) References Cited

FOREIGN PATENT DOCUMENTS

| | | | | |
|---|---|---|---|---|
| CN | 110360945 A | * | 10/2019 | |
| CN | 110925602 A | * | 3/2020 | ............... F17D 5/00 |
| CN | 110984247 A | | 4/2020 | |
| CN | 111442193 A | | 7/2020 | |
| CN | 112393766 A | | 2/2021 | |
| CN | 112697300 A | | 4/2021 | |
| CN | 114485455 A | * | 5/2022 | ............. G01B 11/18 |

* cited by examiner

SYSTEM AND METHOD FOR INTELLIGENT MONITORING STRAIN AND TEMPERATURE OF BULLET TANK BASED ON DISTRIBUTED OPTICAL FIBERS

CROSS-REFERENCE TO RELATED APPLICATIONS

This application is a continuation of International Patent Application No. PCT/CN2022/117757 with a filing date of Sep. 8, 2022, designating the United States, now pending, and further claims priority to Chinese Patent Application No. 202210387450.5 with a filing date of Apr. 14, 2022. The content of the aforementioned applications, including any intervening amendments thereto, are incorporated herein by reference.

FIELD OF TECHNOLOGY

The present disclosure belongs to the technical field of bullet tank strain and temperature monitoring, and particularly relates to a system and method for intelligent monitoring strain and temperature of bullet tank based on distributed optical fibers.

BACKGROUND

Bullet tanks refer to horizontal mounded liquefied petroleum gas (LPG) pressure storage tanks used to store liquefied petroleum gas. At present, bullet tanks are more widely used in foreign countries and are still in the promotion stage in China. The bullet tanks are mainly used to replace spherical tanks and improve the intrinsic safety.

A bullet tank is directly located on a sand bed foundation, with the tank surface being overlaid with soil, and only facilities such as a settlement monitoring plate, a gas chamber and joints of process pipes are reserved outside the soil. As a result, it is impossible to accurately observe the whole operation state of the bullet tank from the states of the above facilities. The main cause of common "domino" accidents of liquefied hydrocarbon storage containers is explosive debris. Therefore, in order to ensure that adjacent bullet tanks are not damaged, the thickness of overlying soil on the tank surface is generally controlled to be half a meter or more, which makes it impossible to observe and monitor the tank surface by traditional methods and prevent the safety hazards of the tank. Moreover, the traditional methods (the settlement monitoring plate) may only roughly observe the settlement of a bullet tank and may not achieve accurate and overall monitoring.

SUMMARY OF PRESENT INVENTION

Aiming at the defects in the prior art, the present disclosure provides a system and method for intelligent monitoring strain and temperature of bullet tank based on distributed optical fibers. The surface and surrounding states of a bullet tank body are monitored through distributed strain fiber optic cables, distributed temperature fiber optic cables and soil pressure gauges, and a cloud image of the surface state of the bullet tank body is constructed, such that an area where a situation occurs is located accurately, early warning is provided in real time, and the problem that safety hazards of the tank body cannot be prevented by existing monitoring methods is effectively solved.

The technical object of the present disclosure is implemented through the following technical solution:

A intelligent method for monitoring strain and temperature of a bullet tank based on distributed optical fibers includes the following steps:

step 1: establishing a 1:1 simulation model of a bullet tank body and a sand bed foundation below in finite element software through a numerical simulation system, and conducting simulations under different working conditions to determine a temperature, stress and strain change range as an initial range for monitoring by a field control system;

step 2: laying distributed strain fiber optic cables and distributed temperature fiber optic cables in a * shape from a head of the bullet tank body, laying a plurality of soil pressure gauges in a position at a 20-80 cm depth under a landing position of the bullet tank body, and landing the bullet tank body with the fiber optic cables laid onto the sand bed foundation;

step 3: gathering temperature data collected by the distributed temperature fiber optic cables to a temperature collector, gathering stress-strain data collected by the distributed strain fiber optic cables to a strain collector, gathering soil pressure basic values collected by the soil pressure gauges to a soil pressure collector, transmitting the data of each collector to the field control system for comparison and analysis to determine whether the data is within the initial range, adjusting the initial range of the field control system and correcting a simulation module of the numerical simulation system if the data is not within the initial range, and meanwhile, transmitting the related data collected by each collector to a central control display screen for display;

step 4: conducting a hydrostatic test on the bullet tank body, further refining and correcting the strain monitoring range by the field control system based on the data collected by the strain collector and the soil pressure collector, and comparing data of a water temperature in the bullet tank body with the data collected by the temperature collector to acquire a temperature difference between an inside and an outside of the bullet tank body as a corrected value for other subsequent tests;

step 5: conducting a filling test on the bullet tank body, monitoring a surface temperature of the bullet tank body through the distributed temperature fiber optic cables, establishing a relationship with a filling rate, monitoring surface strain of the bullet tank body through the distributed strain fiber optic cables, and establishing a relationship with a filling volume so as to establish a temperature compensation relationship for the strain;

step 6: conducting a leakage simulation test on the bullet tank body, controlling a valve to be at the minimum opening degree during discharging, observing a temperature change of the temperature collector and a strain change of the strain collector, and if the data of the temperature collector and the strain collector is not changed, adjusting the accuracy of the corresponding collectors and meanwhile adjusting the control accuracy of the field control system in the case of leakage; and step 7: starting an intelligent identification mode of the field control system for intelligent monitoring: firstly, controlling each collector to conduct trial collection, comparing the collected data with the data range stored in the field control system, selecting the most approximate data as a data collection condition, issuing an instruction of adjusting the accuracy as the collection accuracy under the current condition to each collector, conducting corresponding adjustment by the numerical simulation system based on the condition selected by the field control system, forming temperature and strain cloud images by the adjusted numerical simulation system based on the data transmitted by the field control system, transmitting the monitoring data and cloud image data by the field control system to the central control display screen for display, comparing, by the field control system, the collected data with the initial range stored in the field control system in real time, transmitting warning information to the central control display screen in the case that the detected data is out of the range, and for the leakage situation, positioning a leakage position according to the following formula:

$$T = \frac{\left(\iint_0^{\frac{L}{2}} \alpha 1 \frac{dT}{dr^2} + \int_0^{\frac{L}{2}} \alpha 1 \frac{2}{r} \frac{dT}{dr}\right) + \left(\iint_0^R \alpha 2 \frac{dT}{dr^2} + \int_0^R \alpha 2 \frac{dT}{dr}\right) + T_C}{3}$$

where T denotes a temperature; $T_C$ denotes an ambient temperature at the distributed temperature fiber optic cables; R denotes a radius of the bullet tank body; $\alpha 1$ denotes thermal diffusivity of soil; $\alpha 2$ denotes thermal diffusivity of the tank body; L denotes a radial distance between the adjacent distributed temperature fiber optic cables; and r denotes a shortest distance from a leakage point to a measurement point of the distributed temperature fiber optic cables or a distance from the measurement point of the distributed temperature fiber optic cables to the inside of the tank body.

Further, in step 7, firstly, a position of a lowest temperature point is determined by collecting the data collected by the distributed temperature fiber optic cables for fuzzy determination of an approximate position of the leakage point; then, temperature values of two measurement points above and below the lowest temperature point are compared by the numerical simulation system, a second lowest temperature closer to the lowest temperature is selected for calculation, and a ratio of the lowest temperature to the second lowest temperature is acquired; and finally, a distance between the leakage point and the lowest temperature point may be calculated based on a temperature-distance formula as well as a distance between the known lowest temperature point and a second lowest temperature point and the ratio of the lowest temperature to the second lowest temperature, so as to determine an exact position of the leakage point.

Further, in step 5, an actual strain value is calculated based on formulas $$\Delta\varepsilon_{deviation} = \left[\frac{\alpha}{K}(\beta_j - \beta_b)\Delta t\right] \text{ and } \varepsilon_{actual} = \varepsilon_{measured} - \Delta\varepsilon_{deviation},$$

a measured temperature value and strain data at a current temperature, so as to establish the strain-temperature compensation relationship, adjust the monitoring range of the field control system in a targeted manner, and update the numerical simulation system accordingly, where in the formulas, $\Delta\varepsilon_{deviation}$ denotes a strain deviation, $\beta_j$ denotes a thermal expansion coefficient of the tank body, $\beta_b$ denotes a thermal expansion coefficient of the distributed strain fiber optic cables, $\Delta t$ denotes a temperature change value, $\alpha$ denotes a temperature-strain coefficient of the distributed strain fiber optic cables, K denotes a sensitivity coefficient of the distributed strain fiber optic cables, $\varepsilon_{actual}$ denotes the actual strain value, and $\varepsilon_{measured}$ denotes a measured strain value.

Further, in step 2, during laying of the fiber optic cables, firstly, fiber optic cable laying paths are coated with a layer of epoxy resin base binder using a brush to improve the adhesion of the fiber optic cables, then the fiber optic cables are laid flat and straightly in a base area to avoid bending of the fiber optic cables, and upon completion of laying, the fiber optic cables are coated with a layer of top binder for full fit between the fiber optic cables and the bullet tank body; after the curing strength of the top binder reaches 50% or more, a layer of aluminum foil is pasted on a surface of the top binder to prevent welding slag from burning later; lead portions of the fiber optic cables are protected with steel wire hoses to prevent the fiber optic cables from being damaged at outgoing positions; upon completion of laying of the fiber optic cables, whether the laid distributed strain fiber optic cables and distributed temperature fiber optic cables are conductive is checked by a laser emitter; and if the fiber optic cables are not conductive, break points (there should not be more than 5 break points on one optical fiber, otherwise the quality of measured data may be affected) of the fiber optic cables need to be found through the distributed optical fiber collectors, glue, at the break points, of surfaces of the fiber optic cables is removed, then the break points are fused, glue is applied, and finally related protection is conducted.

Further, in during laying of the soil pressure gauges, firstly, the sand bed foundation is grooved, the soil pressure gauges are fixed to a keel framework, the soil pressure gauges (note: only one soil pressure gauge in a central wavelength range is laid to prevent data interference) are fused in series, leads are fixed to the keel framework, then the keel framework with the plurality of soil pressure gauges fixed is placed into the sand bed foundation, and the other ends of the soil pressure gauges are connected to the leads and are led to the ground to form a loop; and finally, whether the soil pressure gauges are in an intact condition is checked through the soil pressure collector, backfilling is conducted if the soil pressure gauges are in an intact condition, and exposed leads are protected upon completion of backfilling.

Further, in step 6, each collector turns on a built-in measurement signal amplifier, amplified data is transmitted to the field control system, and the field control system calls the data range for leakage simulation in the numerical simulation system to be amplified by the same multiple for comparative control.

Further, in step 7, for other untested or unsimulated working conditions, the field control system collects data and transmits the data to the numerical simulation system, the numerical simulation system conducts simulation based on available data, provides a temperature and strain data range of the bullet tank body under the working conditions, and feeds the temperature and strain data range to the field control system, and accordingly, the field control system establishes a new monitoring mode for the working conditions. In the case that part of the fiber optic cables are damaged, the distributed strain fiber optic cables and the distributed temperature fiber optic cable automatically switch from "loop type" to "unidirectional type", and continue to collect temperature and strain data.

A monitoring system for implementing the above-mentioned method includes the distributed strain fiber optic cables, the distributed temperature fiber optic cables, the soil pressure gauges, the temperature collector, the strain collector, the soil pressure collector, the field control system, the central control display screen, and the numerical simulation system; the bullet tank body is located on the sand bed foundation, and a surface of the bullet tank body is covered with overlying soil;

four distributed strain fiber optic cables and four distributed temperature fiber optic cables are respectively uniformly laid at eight different positions on the surface of the bullet tank body, the distributed strain fiber optic cables and the distributed temperature fiber optic cables of the same group are laid adjacently in parallel, and are distributed at a head of the bullet tank body in a * shape as a whole; the plurality of soil pressure gauges are uniformly laid at a position, with a 20-80 cm depth under the bullet tank body, of the sand bed foundation in series;

the distributed strain fiber optic cables are in signal connection with the strain collector, the distributed temperature fiber optic cables are in signal connection with the temperature collector, and the soil pressure gauges are in signal connection with the soil pressure collector; and the temperature collector, the strain collector and the soil pressure collector are in signal connection with the field control system, the field control system is a receiving end and a transmitting end of data, and the field control system is also in signal connection with the central control display screen and the numerical simulation system for data communication;

the central control display screen is configured to display data information collected by each collector and display operating data of the bullet tank body; and the numerical simulation system, as a central processing unit of the entire intelligent monitoring system, is configured to simulate temperature and strain data ranges of the bullet tank body under different working conditions, transmit the temperature and strain data ranges to the field control system, and update the temperature and strain data ranges autonomously in real time based on data comparison of the field control system and the central control display screen.

Further, the distributed strain fiber optic cables include micro fixed-point distributed strain sensing fiber optic cables and carbon fiber composite based strain sensing fiber optic cables which are uniformly laid on the surface of the bullet tank body.

Further, the distributed temperature fiber optic cables are plastic armored distributed temperature sensing fiber optic cables; the soil pressure gauges are fiber Bragg grating soil pressure gauges; the strain collector is a loop type high-accuracy distributed strain collector configured to monitor the surface stress and strain of the bullet tank body at different working temperatures based on the scattering and reflection principles of light in combination with a relationship between strain and temperature; the temperature collector is a distributed fiber optic temperature collector configured to continuously monitor a temperature of any point on the surface of the bullet tank body based on the Raman scattering principle in combination with an optical time domain reflection technology; and the soil pressure collector is a portable soil pressure data demodulator configured to sense a pressure change based on a wavelength change of light and monitor the stability of the sand bed foundation below the bullet tank body.

The present disclosure has the following beneficial effects:

(1) Compared with a method of determining a few settlement observation points on the top of the bullet tank by experience only, the present disclosure uses the finite element software to simulate the bullet tank body under various conditions to determine the corresponding temperature and stress change range, and the distributed temperature fiber optic cables and the distributed strain fiber optic cables are laid in a targeted manner, such that the current problem of a single way to observe and monitor the state of the bullet tank body is solved, and comprehensive and overall monitoring of the state of the bullet tank body can be achieved. The present disclosure can carry out temperature and strain simulation under different conditions for bullet tanks of different sizes, and carry out targeted monitoring, thereby having wide application prospects.

(2) According to the present disclosure, the temperature fiber optic cables, the strain fiber optic cables and the soil pressure gauges are laid to monitor the temperature, stress and strain of the bullet tank, realizing the "three-in-one" monitoring. Meanwhile, the data of temperature, strain, soil pressure, etc. can be used as reference for each other to jointly provide early warning for the state of the bullet tank.

(4) According to the present disclosure, the various fiber optic cables and sensors laid on the surface of the bullet tank body do not need to be electrified, are not electrically charged, and have no influence on the bullet tank body, which fully meets the safety requirements of the bullet tank body and cannot cause damage to the intrinsic safety of the bullet tank.

(5) According to the present disclosure, the field control system can intelligently identify the operating conditions of the storage tank, autonomously select the measurement frequency, control range and accuracy requirements of temperature, stress-strain and soil pressure values, and meanwhile send the accuracy requirements to each data collector, and each data collector adjusts the collection accuracy. The collected data is transmitted to the numerical simulation system by the field control system, and the numerical simulation system forms the temperature and stress-strain cloud images of the bullet tank body. The central control display screen receives the data from the field control system and then alternately displays the data values and the data cloud images.

(6) According to the present disclosure, an early warning prompt can sound simultaneously on the central control display screen, the field control system, the numerical simulation system and the data collectors. In addition, a position of the tank beyond the early warning is displayed on the screen, and the field control system is in a full-screen display manner.

(7) By improving the Fourier's law formula, the parameter equation of temperature and distance is formed by integrating the thermal radiation effects of the leakage point, the inside of the tank and the ambient temperature, and the temperature is limited to be only related to the distance according to the actual situation, such that the calculation accuracy and the calculation speed of the position of the leakage point are improved.

In the FIGURE: 1—Bullet tank body; 2—Distributed strain fiber optic cable; 3—Distributed temperature fiber optic cable; 4—Soil pressure gauge; 5—Temperature collector; 6—Strain collector; 7—Soil pressure collector; 8—Field control system; 9—Central control display screen; 10—Numerical simulation system; 11—Sand bed foundation; and 12—Overlying soil.

DETAILED DESCRIPTION OF THE EMBODIMENTS

The present disclosure will be further described below with reference to the accompanying drawings and the specific embodiments, but the scope of the present disclosure is not limited thereto.

In the description of the present disclosure, it is to be understood that the terms "connection" etc. are to be interpreted in a broad sense, for example, it may be an integrated connection, or direct connection, or indirect connection through an intermediate medium, or internal communication between two elements. The specific meaning of the above terms in the present disclosure may be understood by a person skilled in the art according to specific circumstances.

Figure 1:
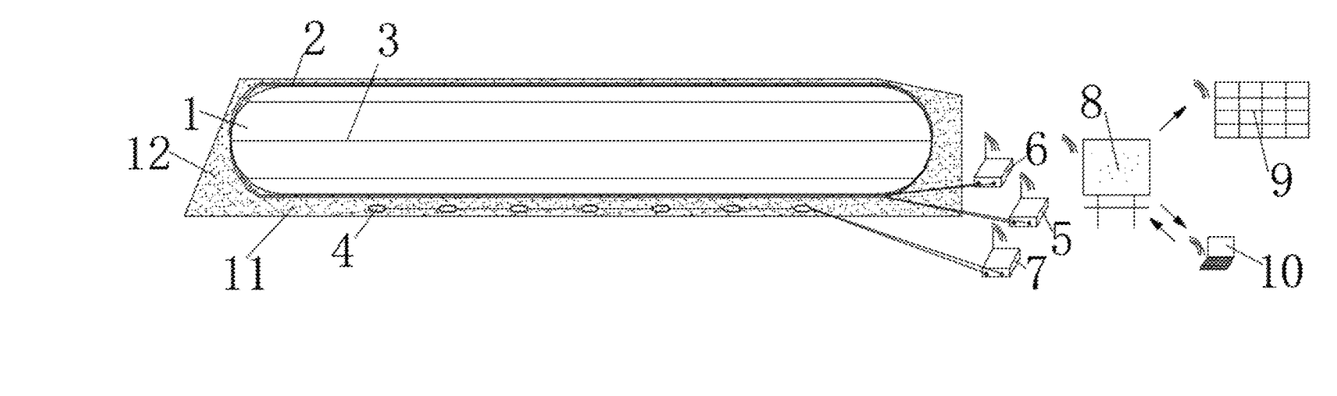
FIG. 1 is a schematic diagram of an intelligent monitoring system according to the present disclosure.

As shown in FIG. 1, a system for intelligent monitoring strain and temperature of a bullet tank based on distributed optical fibers according to the present disclosure includes a bullet tank body 1, distributed strain fiber optic cables 2, distributed temperature fiber optic cables 3, soil pressure gauges 4, a temperature collector 5, a strain collector 6, a soil pressure collector 7, a field control system 8, a central control display screen 9, and a numerical simulation system 10. The bullet tank body 1 is located on a sand bed foundation 11, and a surface of the bullet tank body 1 is covered with overlying soil 12.

As shown in FIG. 1, four distributed strain fiber optic cables 2 are uniformly laid at eight different positions on the surface of the bullet tank body 1. The distributed strain fiber optic cables 2 include micro fixed-point distributed strain sensing fiber optic cables and carbon fiber composite based strain sensing fiber optic cables which are uniformly laid on the surface of the bullet tank body 1, and it is ensured that the distributed strain fiber optic cables 2 are distributed in a * shape at a head of the bullet tank body 1.

As shown in FIG. 1, four distributed temperature fiber optic cables 3 are plastic armored distributed temperature sensing fiber optic cables which are uniformly laid at eight different positions on the surface of the bullet tank body 1, and it is ensured that the distributed temperature fiber optic cables 3 are distributed in a * shape at the head of the bullet tank body 1. Each distributed strain fiber optic cable 2 and each distributed temperature fiber optic cable 3 at the head form a loop respectively. That is, two sets of monitoring data may be obtained from the same point, and the data is sequentially transmitted to the field control system 8 by the corresponding collectors jointly for corresponding self-comparisons.

As shown in FIG. 1, the plurality of soil pressure gauges 4 are laid at a position, with a 20-80 cm depth under the bullet tank body 1, of the sand bed foundation 11. The soil pressure gauges 4 are fiber Bragg grating soil pressure gauges configured to reflect the stability of the sand bed foundation 11 below the bullet tank body 1 by sensing changes of the soil stress and the contact pressure between the structure of the bullet tank body 1 and the soil.

All the distributed strain fiber optic cables 2 are in signal connection with the strain collector 6, and the strain collector 6 is configured to collect strain data detected by the distributed strain fiber optic cables 2. The strain collector 6 is a loop type high-accuracy distributed strain collector configured to effectively monitor the surface strain of the bullet tank body 1 at different working temperatures based on the scattering and reflection principles of light in combination with a relationship between strain and temperature.

All the distributed temperature fiber optic cables 3 are in signal connection with the temperature collector 5, and the temperature collector 5 is configured to collect temperature data detected by the distributed temperature fiber optic cables 3. The temperature collector 5 is a distributed optical fiber temperature collector configured to continuously monitor the temperature of any point on the surface of the bullet tank body 1 based on the Raman scattering principle in combination with an optical time domain reflection technology, and forms an integral temperature monitoring unit for the surface of the bullet tank body 1 in combination with the distributed temperature fiber optic cables 3.

The soil pressure gauges 4 are in signal connection with the soil pressure collector 7, and the soil pressure collector 7 is configured to collect the data of the soil stress and the contact pressure between the structure of the bullet tank body 1 and the soil detected by the soil pressure gauges 4. The soil pressure collector 7 is a portable soil pressure data demodulator configured to sense a pressure change based on a wavelength change of light, so as to monitor the stability of the sand bed foundation 11 below the bullet tank body 1.

As shown in FIG. 1, the temperature collector 5, the strain collector 6 and the soil pressure collector 7 are in signal connection with the field control system 8, the field control system 8 is a receiving end and a transmitting end of data, and the field control system 8 is also in signal connection with the central control display screen 9 and the numerical simulation system 10 for data communication.

The central control display screen 9 is configured to display data information collected by the various data collectors, and display operating data of the bullet tank body 1 for data check, which facilitates the supervision of construction personnel.

The numerical simulation system 10, as a central processing unit of the entire intelligent monitoring system, is configured to simulate temperature and strain data ranges of the bullet tank body 1 under different working conditions, transmit the temperature and strain data ranges to the field control system 8, and update the temperature and strain data ranges autonomously in real time based on data comparison of the field control system 8 and the central control display screen 9.

A method for performing intelligent bullet tank strain and temperature monitoring using the above-mentioned distributed optical fiber-based system for intelligent monitoring strain and temperature of a bullet tank specifically includes the following steps:

Step 1: Establish a 1:1 simulation model in finite element software through a numerical simulation system 10 based on the size data of a bullet tank body 1, and conduct simulation on the bullet tank body 1 under the conditions of an empty tank, a hydrostatic test, a filling test, earthquake, leakage, bad weather, etc. to determine a corresponding temperature, stress and strain change range as an initial range for monitoring by a field control system 8.

Step 2: Lay distributed strain fiber optic cables 2 and distributed temperature fiber optic cables 3 in a * shape from a head of the bullet tank body 1 based on temperature, stress and strain distribution obtained by simulation of the finite element software as well as field monitoring conditions to achieve full-coverage monitoring for the surface of the bullet tank body 1. During laying of the fiber optic cables, firstly, fiber optic cable laying paths are coated with a layer of epoxy resin base binder using a brush to improve adhesion of the fiber optic cables. Then, the fiber optic cables are laid flat and straightly in a base area to avoid bending of the fiber optic cables. Upon completion of laying, the fiber optic cables are coated with a layer of top binder for full fit between the fiber optic cables and the bullet tank body 1. After the curing strength of the top binder reaches 50% or more, a layer of aluminum foil is pasted on a surface of the top binder to prevent welding slag from burning later. Lead portions of the fiber optic cables are protected with steel wire hoses to prevent the lead fiber optic cables from being damaged at outgoing positions.

Step 3: Check, by a laser emitter, whether the distributed strain fiber optic cables 2 and the distributed temperature fiber optic cables 3 laid in Step 2 are conductive; if the fiber optic cables are not conductive, firstly, look for break points (there should not be more than 5 break points on one optical fiber, otherwise the quality of measured data may be affected) of the fiber optic cables through the distributed optical fiber collectors 5 and 6, remove glue, at the break points, of surfaces of the fiber optic cables, then fuse the break points, apply glue, and finally conduct related protection; and then, proceed to Step 4, otherwise, relay the fiber optic cables.

Step 4: Upon completion of laying of all the fiber optic cables, lay a plurality of soil pressure gauges 4 at a position with a 20-80 cm depth under the landing position of the bullet tank body 1. During laying of the soil pressure gauges 4, firstly, a sand bed foundation is grooved, the soil pressure gauges 4 are fixed to a keel framework, the soil pressure gauges 4 (note: only one soil pressure gauge in a central wavelength range is laid to prevent data interference) are fused in series, leads are fixed to the keel framework, then the keel framework with the plurality of soil pressure gauges 4 fixed is placed into the sand bed foundation 11, and the other ends of the soil pressure gauges 4 are connected to the leads and are led to the ground to form a loop. Finally, whether the soil pressure gauges 4 are in an intact condition is checked through a soil pressure collector 7, backfilling is conducted if the soil pressure gauges are in an intact condition, and exposed leads are protected upon completion of backfilling.

Step 5: Land the bullet tank body 1 with the fiber optic cables laid onto the sand bed foundation 11.

Step 6: Upon completion of the landing of the bullet tank body 1, collect the surface temperature of the bullet tank body 1 through the distributed temperature fiber optic cables 3, gather the surface temperature to the temperature collector 5, and correct and calibrate the accuracy and precision of the temperature collector 5; collect surface strain data of the bullet tank body 1 through the distributed strain fiber optic cables 2, gather the surface strain data to the strain collector 6, determine the surface strain data as surface strain basic data of the bullet tank body 1, and meanwhile, adjust the accuracy of the strain collector 6 to reduce the probability of false alarm and ensure that the field requirements are met; and collect soil pressure basic value of the bottom of the bullet tank body 1 through the soil pressure gauges 4, and gather the soil pressure basic value to the soil pressure collector 7 as a reference value for subsequence operations.

Step 7: Transmit the data gathered by the temperature collector 5, the strain collector 6 and the soil pressure collector 7 to the field control system 8 through radio technology for comparison and analysis by a comparison module in the field control system 8, so as to determine whether the data is within the initial range; if the data is not within the initial range, adjust the initial range of the field control system 8 and correct a simulation module of the numerical simulation system 10; and meanwhile, wirelessly transmit the related data of the bullet tank body 1 collected by each collector to a central control display screen 9 for display.

Step 8: Conduct an actual hydrostatic test on the bullet tank body 1, collect the strain data of the bullet tank body 1 through the strain collector 6, collect soil pressure data of the bottom of the bullet tank body 1 through the soil pressure collector 7, further refine and correct, by the field control system 8, the strain monitoring range stored in the field control system, and compare data of a water temperature in the bullet tank body 1 with the data collected by the temperature collector 5 to acquire a temperature difference between an inside and an outside of the bullet tank body 1 as a corrected value for other subsequent tests.

Step 9: Conduct an actual filling test on the bullet tank body 1, monitor surface temperature data of the bullet tank body 1 through the distributed temperature fiber optic cables 3, establish a relationship between the surface temperature data and a filling rate, monitor surface strain of the bullet tank body 1 through the distributed strain fiber optic cables 2, and establish a relationship between the surface strain and a filling volume so as to establish a temperature compensation relationship for the strain.

Specifically, according to the present disclosure, an actual strain value is calculated based on formulas $$\Delta\varepsilon_{deviation} = \left[\frac{\alpha}{K}(\beta_j - \beta_b)\Delta t\right] \text{ and } \varepsilon_{actual} = \varepsilon_{measured} - \Delta\varepsilon_{deviation},$$

a measured temperature value and strain data at a current temperature, so as to establish the strain-temperature compensation relationship, adjust the monitoring range of the field control system 8 in a targeted manner, and update the numerical simulation system 10 accordingly. In the formulas, $\Delta\varepsilon_{deviation}$ denotes a strain deviation, $\beta_j$ denotes a thermal expansion coefficient of the tank body, $\beta_b$ denotes a thermal expansion coefficient of the distributed strain fiber optic cables 2, $\Delta t$ denotes a temperature change value, $\alpha$ denotes a temperature-strain coefficient of the distributed strain fiber optic cables 2, K denotes a sensitivity coefficient of the distributed strain fiber optic cables 2, $\varepsilon_{actual}$ denotes the actual strain value, and $\varepsilon_{measured}$ denotes a measured strain value.

Step 10: Conduct a leakage simulation test on the bullet tank body 1, control a valve to be at the minimum opening degree during discharging of the bullet tank body 1, observe a temperature change of the temperature collector 5 and a strain change of the strain collector 6, adjust the accuracy of the corresponding collectors if the temperature collector 5 and the strain collector 6 are not changed, and meanwhile, adjust the control accuracy of the field control system 8 in the case of leakage. Specifically, each collector turns on a built-in measurement signal amplifier, amplified data is transmitted to the field control system 8, and the field control system 8 calls the data range for leakage simulation in the numerical simulation system 10 to be amplified by the same multiple for comparative control.

Step 11: Upon the above tests and simulations, after the field control system 8 completes the confirmation of the temperature and strain monitoring range under various conditions and the degree of approximation of the temperature and strain simulation of the numerical simulation system 10 to the actual situation is increased, start an intelligent identification mode of the field control system 8 for intelligent monitoring.

Step 12: Control, by the field control system 8, the temperature collector 5, the strain collector 6 and the soil pressure collector 7 to conduct trial collection firstly, compare the collected data with the data range stored in the field control system 8, select the most approximate data as a data collection condition, issue an instruction of adjusting the accuracy as the collection accuracy under the current condition to each collector, automatically adjust the collection accuracy by each collector upon receiving the related instruction, then formally begin to collect all data of the bullet tank body 1 in real time, meanwhile, conduct corresponding adjustment by the numerical simulation system 10 based on the condition selected by the field control system 8, form temperature and strain cloud images of the bullet tank body 1 by the adjusted numerical simulation system 10 based on the data transmitted by the field control system 8, and transmit, by the field control system 8, the monitoring data and cloud image data formed by the numerical simulation system 10 to the central control display screen 9 for display. Thus, field personnel may check the data in real time so as to master various conditions of the bullet tank body 1.

For special geological conditions and severe weather conditions, the field control system 8 selects the most extreme conditions available to control each collector for temperature and strain data collection. Meanwhile, the collected data is compared with the initial range stored in the field control system. When the detected data is out of range, warning information is transmitted to the central control display screen 9 to remind relevant personnel to pay attention to the situation.

For other untested or unsimulated working conditions, the field control system 8 collects data and transmits the data to the numerical simulation system 10, the numerical simulation system 10 conducts simulation based on available data, provides a temperature and strain data range of the bullet tank body 1 under the working conditions, and feeds the temperature and strain data range to the field control system 8, and accordingly, the field control system 8 establishes a new monitoring mode for the working conditions.

In the case that part of the fiber optic cables are damaged, the distributed strain fiber optic cables 2 and the distributed temperature fiber optic cables 3 automatically switch from "loop type" to "unidirectional type", and meanwhile may collect temperature or strain data.

For a leakage situation, according to the present disclosure, the temperature is limited not to change with time according to the actual situation, the parameter conditions are simplified, the range and the distance are assigned, and the influence of the tank body and the soil on the temperature are taken into consideration at the same time according to the actual situation. A leakage position is positioned according to Formula (1) as follows:

$$T = \frac{\left(\int\int_0^{\frac{L}{2}} \alpha 1 \frac{dT}{dr^2} + \int_0^{\frac{L}{2}} \alpha 1 \frac{2}{r} \frac{dT}{dr}\right) + \left(\int\int_0^{R} \alpha 2 \frac{dT}{dr^2} + \int_0^{R} \alpha 2 \frac{2}{r} \frac{dT}{dr}\right) + T_C}{3} \quad (1)$$

where T denotes a temperature; $T_C$ denotes an ambient temperature at the distributed temperature fiber optic cables 3; R denotes a radius of the bullet tank body 1; $\alpha 1$ denotes thermal diffusivity of soil; $\alpha 2$ denotes thermal diffusivity of the tank body; L denotes a radial distance between the adjacent distributed temperature fiber optic cables 3; and r denotes a shortest distance from a leakage point to a measurement point of the distributed temperature fiber optic cables 3 or a distance from the measurement point of the distributed temperature fiber optic cables 3 to the inside of the tank body.

In practical applications, firstly, a position of a lowest temperature point is determined by collecting the data collected by the distributed temperature fiber optic cables 3 for fuzzy determination of an approximate position of the leakage point. Then, temperature values of two measurement points above and below the lowest temperature point are compared by the numerical simulation system 10, and a second lowest temperature closer to the lowest temperature is selected for calculation, where the lowest temperature and the second lowest temperature are obtained by calculation according to Formula (1). A ratio of the lowest temperature to the second lowest temperature is acquired. Finally, a distance between the leakage point and the lowest temperature point may be calculated based on the temperature-distance formula (1) as well as a distance between the known lowest temperature point and a second lowest temperature point and the ratio of the lowest temperature to the second lowest temperature, so as to determine an exact position of the leakage point.

By means of the calculation method according to the present disclosure, the temperature is limited to be only related to the distance according to the actual situation, such that the calculation accuracy and the calculation speed of the position of the leakage point are improved.

The above-mentioned embodiments are preferred embodiments of the present disclosure, but the present disclosure is not limited thereto. Any obvious modifications, substitutions or variations that may be made by a person skilled in the art without departing from the spirit of the present disclosure fall within the scope of the present disclosure.

What is claimed is:

1. An intelligent method for monitoring strain and temperature of a bullet tank based on distributed optical fibers, comprising the following steps:

step 1: establishing a 1:1 simulation model of a bullet tank body (1) and a sand bed foundation (11) below in a finite element software through a numerical simulation system (10), and conducting simulations under different working conditions to determine a temperature, stress and strain change range as an initial range for monitoring by a field control system (8);

step 2: laying distributed strain fiber optic cables (2) and distributed temperature fiber optic cables (3) in a * shape from a head of the bullet tank body (1), laying a plurality of soil pressure gauges (4) in the sand bed foundation (11) under a landing position of the bullet tank body (1), and landing the bullet tank body (1) with the fiber optic cables laid onto the sand bed foundation (11);

step 3: gathering temperature data collected by the distributed temperature fiber optic cables (3) to a temperature collector (5), gathering strain data collected by the distributed strain fiber optic cables (2) to a strain collector (6), gathering soil pressure basic values collected by the soil pressure gauges (4) to a soil pressure collector (7), correcting and calibrating an accuracy of each collector, transmitting the data of each collector to the field control system (8) for comparison and analysis to determine whether the data is within the initial range, proceeding to step 4 if the data is within the initial range, otherwise, adjusting the initial range of the field control system (8) and correcting a simulation module of the numerical simulation system (10);

step 4: conducting a hydrostatic test on the bullet tank body (1), further refining and correcting the strain monitoring range by the field control system (8) based on the data collected by the strain collector (6) and the soil pressure collector (7), and acquiring a temperature difference between an inside and an outside of the bullet tank body (1) through comparison to serve as a corrected value for other subsequent tests;

step 5: conducting a filling test on the bullet tank body (1), monitoring surface temperature data of the bullet tank body (1) through the distributed temperature fiber optic cables (3), establishing a relationship with a filling rate, monitoring surface strain of the bullet tank body (1) through the distributed strain fiber optic cables (2), and establishing a relationship with a filling volume so as to establish a temperature compensation relationship for the strain;

step 6: conducting a leakage simulation test on the bullet tank body (1), observing changes of the temperature collector (5) and the strain collector (6), adjusting the accuracy of the collectors based on the changes, and adjusting the control accuracy of the field control system (8); and step 7: starting an intelligent identification mode of the field control system (8) for intelligent monitoring: firstly, controlling each collector to conduct trial collection, comparing the collected data with the data range stored in the field control system (8), selecting the most approximate data as a data collection condition, issuing an instruction of adjusting the accuracy as the collection accuracy under the current condition to each collector, conducting corresponding adjustment by the numerical simulation system (10) based on the condition selected by the field control system (8), forming temperature and strain cloud images by the adjusted numerical simulation system (10) based on the data transmitted by the field control system (8), transmitting the monitoring data and cloud image data by the field control system (8) to a central control display screen (9) for display, comparing, by the field control system (8), the collected data with the initial range stored in the field control system in real time, transmitting warning information to the central control display screen (9) in the case that the detected data is out of the range, and for the leakage situation, positioning a leakage position according to the following formula:

$$T = \frac{\left(\int\int_0^{\frac{L}{2}} \alpha 1 \frac{dT}{dr^2} + \int_0^{\frac{L}{2}} \alpha 1 \frac{2}{r} \frac{dT}{dr}\right) + \left(\int\int_0^{R} \alpha 2 \frac{dT}{dr^2} + \int_0^{R} \alpha 2 \frac{2}{r} \frac{dT}{dr}\right) + T_C}{3}$$

wherein T denotes a temperature; $T_C$ denotes an ambient temperature at the distributed temperature fiber optic cables (3); R denotes a radius of the bullet tank body (1); α1 denotes thermal diffusivity of soil; α2 denotes thermal diffusivity of the tank body; L denotes a radial distance between the adjacent distributed temperature fiber optic cables (3); and r denotes a shortest distance from a leakage point to a measurement point of the distributed temperature fiber optic cables (3) or a distance from the measurement point of the distributed temperature fiber optic cables (3) to the inside of the tank body.

2. The method according to claim 1, wherein in step 7, firstly, a position of a lowest temperature point is determined by collecting the data collected by the distributed temperature fiber optic cables (3) for fuzzy determination of an approximate position of the leakage point; then, temperature values of two measurement points above and below the lowest temperature point are compared by the numerical simulation system (10), a second lowest temperature closer to the lowest temperature is selected for calculation, and a ratio of the lowest temperature to the second lowest temperature is acquired; and finally, a distance between the leakage point and the lowest temperature point is calculated based on a temperature-distance formula as well as a distance between the known lowest temperature point and a second lowest temperature point and the ratio of the lowest temperature to the second lowest temperature, so as to determine an exact position of the leakage point.

3. The method according to claim 1, wherein in step 5, an actual strain value is calculated based on formulas $$\Delta\varepsilon_{deviation} = \left[\frac{\alpha}{K}(\beta_j - \beta_b)\Delta t\right] \text{ and } \varepsilon_{actual} = \varepsilon_{measured} - \Delta\varepsilon_{deviation},$$

a measured temperature value and strain data at a current temperature, so as to establish the strain-temperature compensation relationship, adjust the monitoring range of the field control system (8) in a targeted manner, and update the numerical simulation system (10) accordingly, wherein in the formulas, $\Delta\varepsilon_{deviation}$ denotes a strain deviation, $\beta_j$ denotes a thermal expansion coefficient of the tank body, $\beta_b$ denotes a thermal expansion coefficient of the distributed strain fiber optic cables (2), Δt denotes a temperature change value, α denotes a temperature-strain coefficient of the distributed strain fiber optic cables (2), K denotes a sensitivity coefficient of the distributed strain fiber optic cables (2), $\varepsilon_{actual}$ denotes the actual strain value, and $\varepsilon_{measured}$ denotes a measured strain value.

4. The method according to claim 1, wherein in step 2, during laying of the fiber optic cables, firstly, fiber optic cable laying paths are coated with a layer of epoxy resin base binder using a brush, then the fiber optic cables are laid flat and straightly in a base area to avoid bending of the fiber optic cables, and upon completion of laying, the fiber optic cables are coated with a layer of top binder for full fit between the fiber optic cables and the bullet tank body (1); after the curing strength of the top binder reaches 50% or more, a layer of aluminum foil is pasted on a surface of the top binder to prevent welding slag from burning later; lead portions of the fiber optic cables are protected with steel wire hoses to prevent the fiber optic cables from being damaged at outgoing positions; upon completion of laying of the fiber optic cables, whether the laid distributed strain fiber optic cables (2) and distributed temperature fiber optic cables (3) are conductive is checked by a laser emitter; and if the fiber optic cables are not conductive, break points of the fiber optic cables are found through the temperature collector (5) and the strain collector (6), glue, at the break points, of surfaces of the fiber optic cables is removed, then the break points are fused, glue is reapplied, and finally protection is conducted.

5. The method according to claim 1, wherein in step 2, the soil pressure gauges (4) are laid at a position, with a 20-80 cm depth under the landing position of the bullet tank body (1), of the sand bed foundation (11); during laying of the soil pressure gauges (4), firstly, the sand bed foundation (11) is grooved, the soil pressure gauges (4) are fixed to a keel framework, and the soil pressure gauges (4) are fused in series, only one soil pressure gauge in a central wavelength range being laid to prevent data interference; then leads are fixed to the keel framework, the keel framework with the plurality of soil pressure gauges (4) fixed is placed into the sand bed foundation (11), and the other ends of the soil pressure gauges (4) are connected to the leads and are led to the ground to form a loop; and finally, whether the soil pressure gauges (4) are in an intact condition is checked through the soil pressure collector (7), backfilling is conducted if the soil pressure gauges are in an intact condition, and exposed leads are protected upon completion of backfilling.

6. The method according to claim 1, wherein in step 6, the control accuracy of the field control system (8) is adjusted in the following way: each collector turns on a built-in measurement signal amplifier, amplified data is transmitted to the field control system (8), and the field control system (8) calls the data range for leakage simulation in the numerical simulation system (10) to be amplified by same multiple for comparative control.

7. The method according to claim 1, wherein in step 7, for other untested or unsimulated working conditions, the field control system (8) collects data and transmits the data to the numerical simulation system (10), the numerical simulation system (10) conducts simulation based on available data, provides a temperature and strain data range of the bullet tank body (1) under the working conditions, and feeds the temperature and strain data range to the field control system (8), and the field control system (8) establishes a new monitoring mode for the working conditions.

8. A system for intelligent monitoring strain and temperature of the bullet tank for implementing the method according to claim 1, comprising the distributed strain fiber optic cables (2), the distributed temperature fiber optic cables (3), the soil pressure gauges (4), the temperature collector (5), the strain collector (6), the soil pressure collector (7), the field control system (8), the central control display screen (9), and the numerical simulation system (10), wherein the bullet tank body (1) is located on the sand bed foundation (11), and a surface of the bullet tank body is covered with overlying soil (12);

four distributed strain fiber optic cables (2) and four distributed temperature fiber optic cables (3) are respectively uniformly laid at eight different positions on the surface of the bullet tank body (1), the distributed strain fiber optic cables (2) and the distributed temperature fiber optic cables (3) of the same group are laid adjacently in parallel, and are distributed at a head of the bullet tank body (1) in a * shape as a whole; the plurality of soil pressure gauges (4) are uniformly laid at a position, with a 20-80 cm depth under the bullet tank body (1), of the sand bed foundation (11) in series;

the distributed strain fiber optic cables (2) are in signal connection with the strain collector (6), the distributed temperature fiber optic cables (3) are in signal connection with the temperature collector (5), and the soil pressure gauges (4) are in signal connection with the soil pressure collector (7); and the temperature collector (5), the strain collector (6) and the soil pressure collector (7) are in signal connection with the field control system (8), the field control system (8) is a receiving end and a transmitting end of data, and the field control system (8) is also in signal connection with the central control display screen (9) and the numerical simulation system (10) for data communication;

the central control display screen (9) is configured to display data information collected by each collector and display operating data of the bullet tank body (1); and the numerical simulation system (10), as a central processing unit of the entire intelligent monitoring system, is configured to simulate temperature and strain data ranges of the bullet tank body (1) under different working conditions, transmit the temperature and strain data ranges to the field control system (8), and update the temperature and strain data ranges autonomously in real time based on data comparison of the field control system (8) and the central control display screen (9).

9. The system according to claim 8, wherein the distributed strain fiber optic cables (2) comprise micro fixed-point distributed strain sensing fiber optic cables and carbon fiber composite based strain sensing fiber optic cables which are uniformly laid on the surface of the bullet tank body (1).

10. The system according to claim 8, wherein the distributed temperature fiber optic cables (3) are plastic armored distributed temperature sensing fiber optic cables; the soil pressure gauges (4) are fiber Bragg grating soil pressure gauges; the strain collector (6) is a loop type high-accuracy distributed strain collector configured to monitor the surface strain of the bullet tank body (1) at different working temperatures based on the scattering and reflection principles of light in combination with a relationship between strain and temperature; the temperature collector (5) is a distributed optical fiber temperature collector configured to continuously monitor a temperature of any point on the surface of the bullet tank body (1) based on the Raman scattering principle in combination with an optical time domain reflection technology; and the soil pressure collector (7) is a portable soil pressure data demodulator configured to sense a pressure change based on a wavelength change of light and monitor the stability of the sand bed foundation (11) below the bullet tank body (1).

* * * * *